United States Patent [19]

Omura

[11] 4,207,502

[45] Jun. 10, 1980

[54] MOTOR DRIVING SYSTEM FOR REMOTE CONTROLLED MOBILE TOYS

[75] Inventor: Yoshihiko Omura, Gotsu, Japan

[73] Assignee: Asahi Corporation, Tokyo, Japan

[21] Appl. No.: 864,805

[22] Filed: Dec. 27, 1977

[51] Int. Cl.² .............................................. B62D 11/04
[52] U.S. Cl. .................................... 318/16; 318/587;
46/254
[58] Field of Search ................... 318/16, 587, 78, 318,
318/110; 46/254, 251, 253, 248, 249

[56] References Cited

U.S. PATENT DOCUMENTS

| 3,436,634 | 4/1969  | Baldwin et al. | 318/318   |
| 3,614,990 | 10/1971 | Schnitzer      | 318/587 X |
| 3,814,199 | 6/1974  | Jones          | 318/587 X |
| 3,911,336 | 10/1975 | Diggs          | 318/16 X  |
| 4,010,409 | 3/1977  | Waites         | 318/16 X  |

*Primary Examiner*—B. Dobeck
*Attorney, Agent, or Firm*—Lewis Anten

[57] ABSTRACT

Separate high low pass of frequency filters are employed in a circuit to control the input response signal to a pair of motors for operating a mobile toy in response to a frequency modulated radio wave transmitted by a transmitting unit.

4 Claims, 6 Drawing Figures

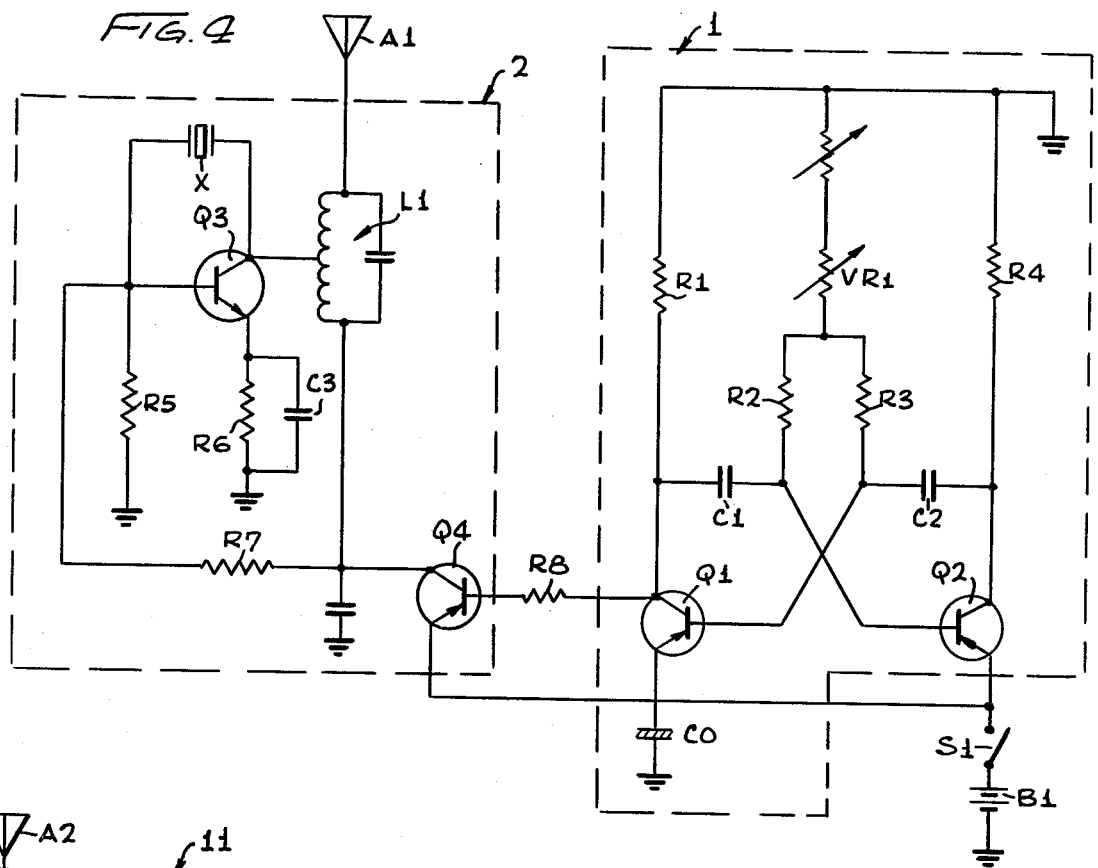
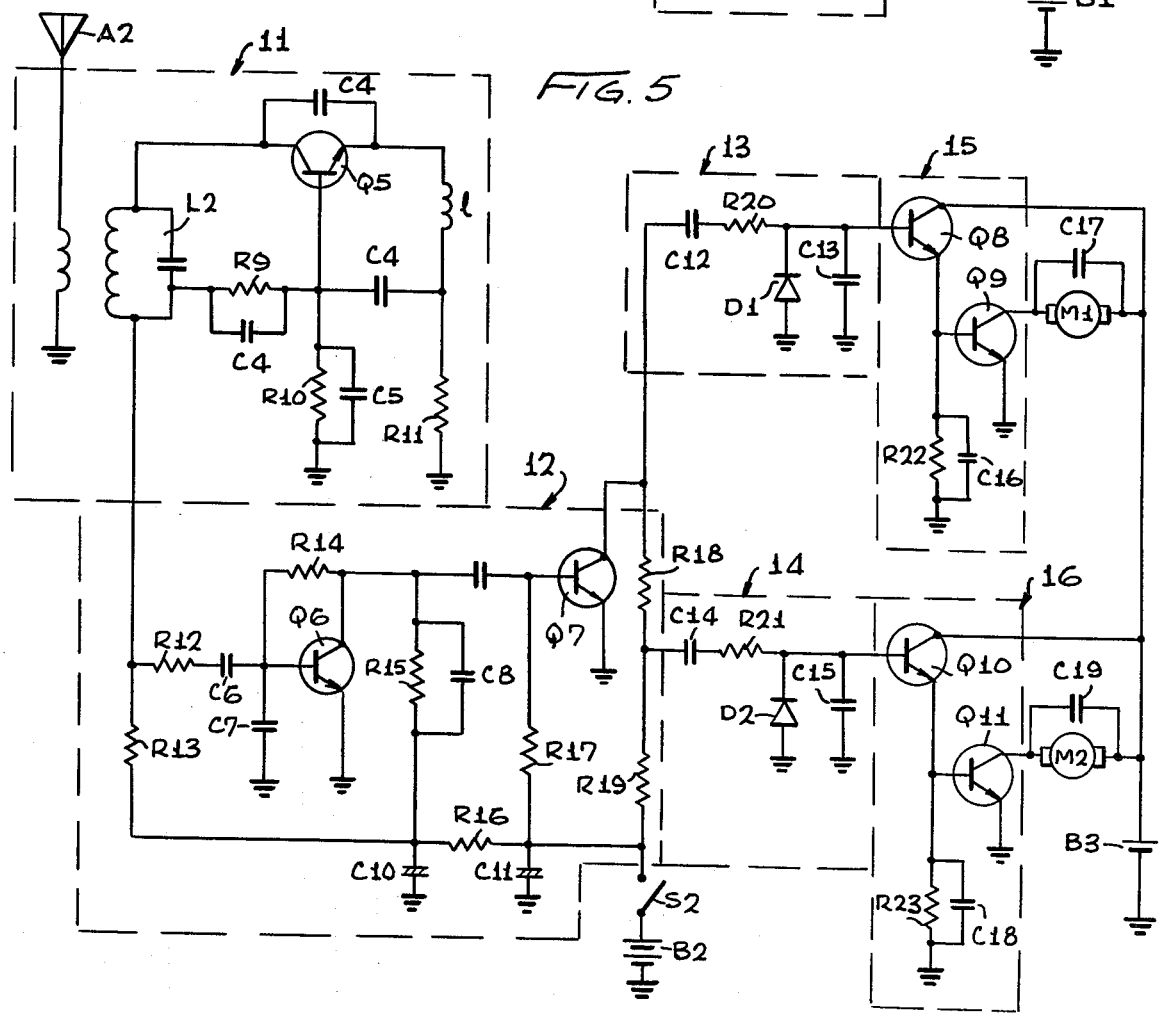

MOTOR DRIVING SYSTEM FOR REMOTE CONTROLLED MOBILE TOYS

BACKGROUND OF THE INVENTION

The present invention relates to remote radio controlled mobile toys, and in particular to radio controlled car toys in which the direction of the car is to be altered by a transmitted radio signal. In conventional systems of this type two separate motors are connected to the left and right driving wheels of the car which are driven by the radio wave-detector output of a pulse width modulated high frequency or low frequency signal. The direction of travel of the mobile toy is altered by varying the pulse width of the signal. However, since such devices are pulse width modulated systems, they suffer from the drawbacks of complicated construction, high cost and susceptibility to external noise as well as other disadvantages recognized from the use of pulse width modulated signals.

In the present invention which relates to remote radio controlled mobile toys, a pair of filters, one a high pass frequency filter, the other a low pass frequency filter, have their outputs connected to separate motors, one motor driving the right wheel of the vehicle, the other motor driving the left wheel. As the frequency of the transmitted signal is increased or decreased, the voltage to one of the motors is increased while the voltage to the other motor is decreased, thereby increasing or decreasing the speed of rotation of the respective wheels, resulting in a change in direction of the toy vehicle.

Accordingly, it is an object of the present invention to provide a system for reliably controlling the direction of radio controlled toy vehicles.

It is another object of the present invention to provide a simple and economic circuit for controlling a radio controlled toy vehicle.

It is still another object of the present invention to provide a toy vehicle which can be easily manipulated and controlled.

It is still another object of the invention to provide a circuit for controlling the direction of a radio controlled vehicle which is less susceptible to external noise.

These and other objects of the present invention will be readily appreciated from a reading of the following description of the invention and the accompanying drawings.

BRIEF DESCRIPTION OF THE DRAWINGS

FIG. 4 is a detailed diagram of the preferred embodiment of the transmitting unit of FIG. 1.

FIG. 5 is a detailed diagram of the preferred embodiment of the receiving and driving unit of FIG. 2.

DETAILED DESCRIPTION OF THE DRAWINGS

Figure 1:
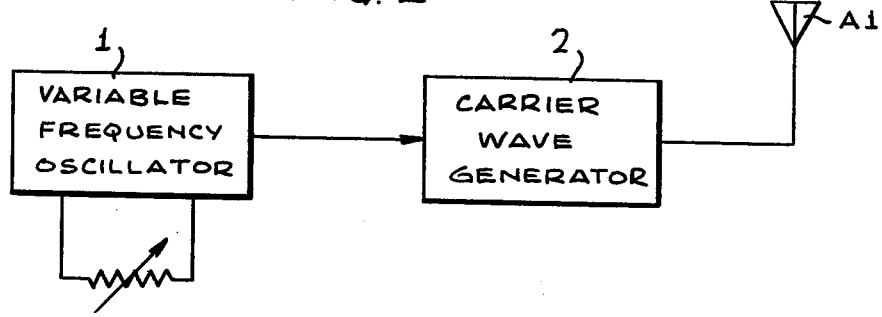
FIG. 1 is a schematic diagram of the transmitting unit.

Referring to FIG. 1, a block diagram of the transmitting unit is shown. A variable frequency oscillator 1 for modulating the frequency to be transmitted has its output signal connected to a high frequency oscillator 2 for generating a carrier wave. The carrier wave is then radiated into space by the antenna A1.

Figure 2:
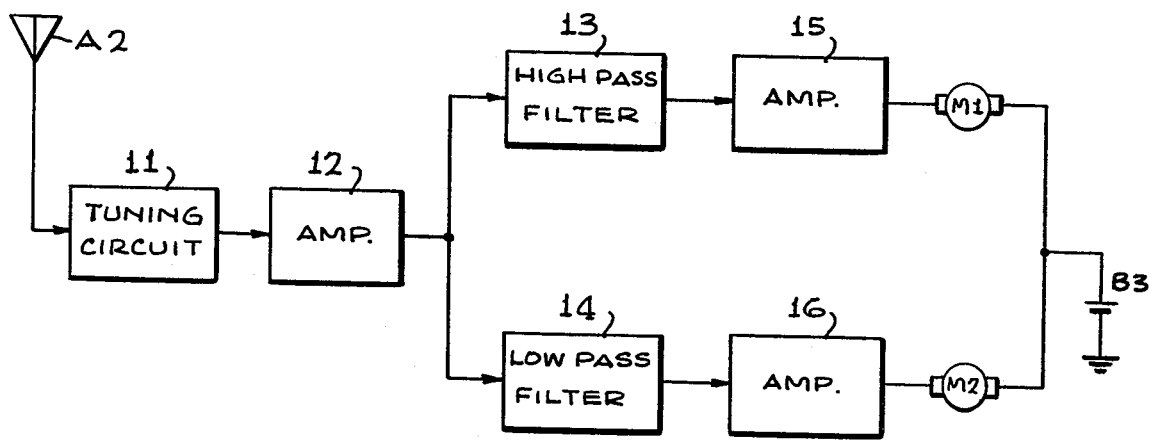
FIG. 2 is a schematic diagram of the receiver and driving unit.

Referring to FIG. 2 a block diagram of the receiver and operating circuitry is shown. The receiving antenna A2 is connected to a tuned wave detecting circuit 11 for detecting the waves transmitted by antenna A1. The output of the tuned wave detecting circuit 11 is connected to amplifier 12 which in turn has its output connected to the input of a high pass frequency as well as the filter 13 input to a low pass frequency filter 14. The output of filters 13 is connected to amplifier 15 while the output of filter 14 has its output connected to the input of amplifier 16. The outputs of amplifiers 14 and 16 are connected to separate motors M1 and M2, respectively. The other side of the motors M1 and M2 are connected to voltage potential B3.

The variable frequency oscillator 1 and the high frequency carrier wave oscillator 2 may be of conventional construction.

Figure 3:
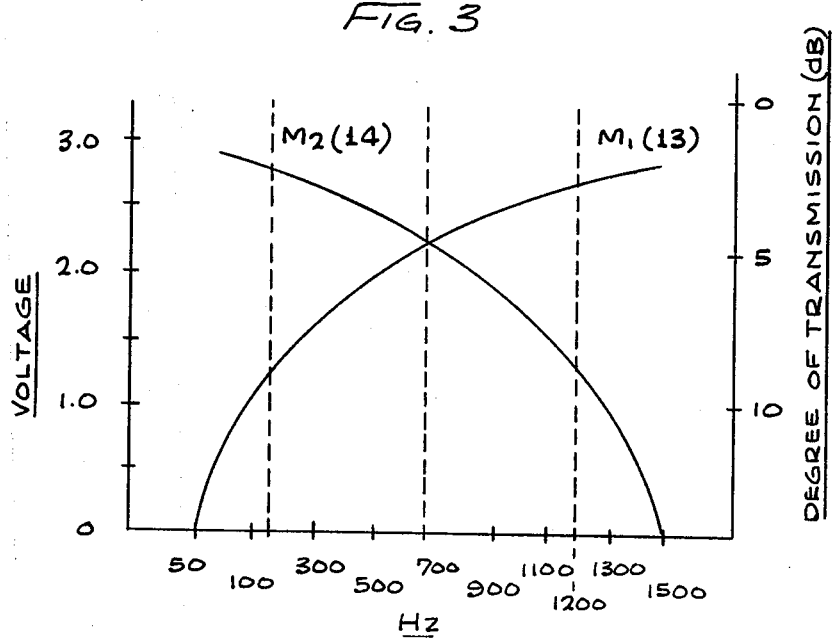
FIG. 3 is the graph of frequency characteristics of the filters shown in FIG. 2.
Figure 2A:
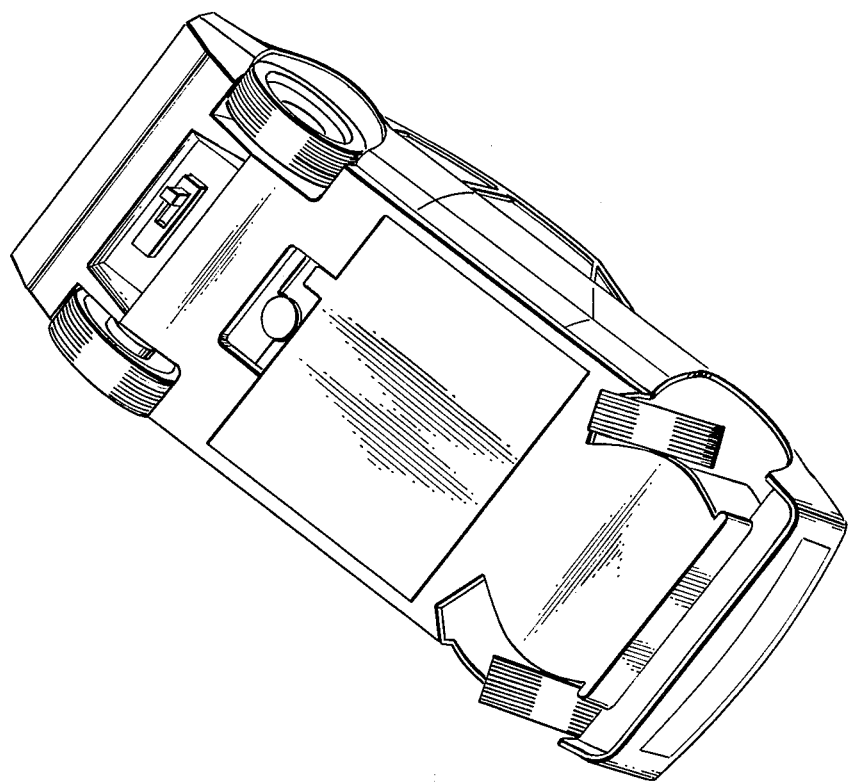
FIG. 2a is a bottom perspective view of the toy vehicle and wheels.

The high pass frequency filter 13 extracts the higher frequency components of the output signals from the amplifier 12 and the low pass frequency filter 14 extracts the lower frequency components of the output signal from the amplifier 12. The frequency characteristics of filters 13 and 14 are shown in FIG. 3. In the preferred embodiment of the present invention, the degree of signal transmission to amplifiers 15 and 16 are equal when the input frequency to the filters are 700 Hz.

The output signals from filters 13 and 14 are separately amplified by amplifiers 15 and 16. The output of each of the amplifiers serves as an input to the left and right motors M1 and M2 which have their drive shafts connected by appropriate means to the left and right driving sheels of the mobile toy. Accordingly, as shown in FIG. 3, the terminal voltages of the respective motors M1 and M2 vary with the modulation frequency of the transmitting unit. A detailed description of the components used in the transmitting and receiving system is shown in FIG. 4.

As shown in FIG. 4, the transmitter unit consists of a variable frequency oscillator 1 for modulation, consisting of transisters Q1 and Q2, capacitors C1 and C2, resistors R1 through R4, a variable resistor R1 used to vary the modulation frequency, and a high-frequency oscillator 2 consisting of an antenna and parallel tank circuit L1 tuned in the preferred embodiment to 27.125 MHz or 40.0 MHz, and radiating waves of that frequency, a transistor for oscillation having a crystal oscillator X, a buffer transistor Q4, resistors R5 through R8, and capacitor C3.

A detailed description of the preferred embodiment of the receiver unit of FIG. 2 is shown in FIG. 5. As shown in FIG. 5, the receiver unit consists of a tuned detector circuit consisting of a tuner circuit L2 for tuning in the waves of the desired frequency received by the receiving antenna A2, a transistor Q5 for detecting the tuned waves, resistors R9 through R11, capacitors C4 and C5, a choke coil L, an amplifier 12 for amplifying the detector output consisting of transistors Q6 and Q7, resistors R12 through R19, and capacitors C6 through C11, a high-pass filter 13 consisting of capacitors C12 and C13, resistor R20 and a diode D1, a low-pass filter 14 similarly consisting of capacitors C14 and C15, resistor R21 and diode D2, an amplifier 15 which is for driving motor M1 connected with the left driving wheel of the mobile toy, and which consists of transistors Q8 and Q9, a resistor R22, and capacitors C16 and C17, and amplifier 16 for driving motor M2 connected with the right driving wheel of the mobile toy, and which similarly consists of transistors Q10 and Q11, resistor R23, and capacitors C18 and C19.

Furthermore, B1 and S1 respectively indicate a power source and a switch installed in the transmitter unit (see FIG. 4), and B2 and B3 and S2 respectively indicate power sources and a switch installed in the receiver unit (see FIG. 5).

The following is a detailed description of the operation of the device.

The parameters of the various components are fixed so that the modulation frequency will be approximately 700 Hz when the slide contact (r) of the variable resistor VR1 is located near the central point of the resistor. In this condition, 27.125 MHz or 40.0 MHz waves which are amplitude-modulated at a frequency of 700 Hz are radiated into space by the transmitting antenna A1.

The transmitted waves are received by the receiving antenna A2 and sent to the high-pass filter (12) and low-pass filter 13 via the amplifier 12 after tuning and wave detection. The characteristics of the filters 13 and 14 are such that they show approximately the same impedance to a 700 Hz signal. Accordingly, they will also show the same degree of signal transmission at this frequency. Furthermore, the capacitances of the capacitors C12 and C13 in the high-pass filter are respectively set at 0.002 $\mu$F and 0.047 $\mu$F, and the resistance of the resistor R21 at approximately 4.7 K, so that the high-pass filter 13 and low-pass filter 14 will respectively allow signals above and below 700 Hz to easily pass through.

Accordingly, when the modulation frequency of the waves received from the transmitter unit is 700 Hz, a voltage of approximately 2.3 volts will be applied equally to the left and right motors M1 and M2, rotating the left and right motors at the same speed so that the mobile toy moves directly forward.

On the other hand, if the modulation frequency is adjusted to a value above 700 Hz, e.g., approximately 1200 Hz, the degree of signal transmission through the high-pass filter 13 increases, while the amount of signal passing through the low-pass filter 14 decreases. Therefore, the diodes D1 and D2 will cause the base currents of the transistors Q8 and Q10 in the left and right amplifiers 15 and 16, respectively, to increase and decrease. The terminal voltage of the motor connected to the left wheel M1 will be approximately 2.75 volts (as shown in FIG. 3), while the terminal voltage of the motor connected to the right wheel M2 will be approximately 1.4 volts. As a result, the rotational speed of the left driving wheel will increase, and the speed of the right driving wheel will decrease, so that the mobile toy will turn to the left. If the modulation frequency is afterward adjusted back to 700 Hz by manipulating the variable resistor VR1, the mobile toy will again travel directly forward. No mechanical means is required to turn the direction of the car.

Furthermore, if the modulation frequency is adjusted to approximately 120 Hz, the exact reverse of the abovementioned operation will occur, and the mobile toy will turn to the right. Furthermore, the right and left driving wheels can be individually stopped by adjusting the modulation frequency to 1500 Hz and 50 Hz, respectively. It is thus possible to cause the mobile toy to make abrupt turns to the left or right.

In the abovementioned embodiment, an application of a toy wheeled vehicle was described. However, this invention is not limited to such an application, but can also be appplied to tracked mobile toys such as toy tanks and tractors, and to model motorboats and steamships. In such a case, it is necessary only to respectively connect the motors M1 and M2 with the left and right track driving wheels, or with port and starboard screws on the hull of the aforementioned mobile toy boat, either via decelerators or without such mechanisms.

This invention accordingly possesses a great number of merits. It permits radio controlled toy vehicles to be built very simply and inexpensively; it provides extremely stable radio control response with respect to external interference and noise and eliminates mechanical problems associated with such toys.

What I claim is:

1. Apparatus responsive to a frequency modulated radio wave signal comprising:
    (a) circuit means for detecting a frequency modulated signal;
    (b) circuit means for generating a frequency signal responsive to said frequency modulated signal detected;
    (c) at least first and second frequency filter means for receiving the output of the frequency signal, the output signal of said first filter increases when the input frequency increases and decreases when said frequency decreases the output of said second filter decreases when input frequency increases and increases when said frequency decreases, said first filter having at least a portion of its frequency band overlapping the frequency band of said second filter;
    (d) and at least first and second motors, the speed of said first motor responsive to the output signal of said first filter and the speed of said second motor being responsive to the output of said second motor.

2. The apparatus of claim 1 in which said first motor is mechanically coupled to one wheel of a toy vehicle and the second motor is mechanically coupled to a second wheel of a toy vehicle.

3. The apparatus of claim 2 in which said first and second wheels are located on opposite sides of the first of a toy vehicle.

4. A system for generating a remotely controlled vehicle comprising:
    (a) means for transmitting a frequency modulated signal;
    (b) means for varying the frequency modulated signal;
    (c) means for detecting said frequency modulated signal and generating a frequency signal responsive to the detected frequency modulated signal;
    (d) first and second frequency filters, said first frequency filter being a high-pass frequency filter and said second frequency filter being a low-pass filter; the generated frequency signal being an input to the high-pass filter and the low pass filter, the output signal of the low-pass filter controlling the speed of a first motor and the output signal of the high-pass filter controlling the speed of a second motor, said high pass filter having at least a portion of its frequency band the same as at least a portion of the frequency band of the low pass filter.

* * * * *

UNITED STATES PATENT AND TRADEMARK OFFICE
CERTIFICATE OF CORRECTION

PATENT NO. : 4,207,502
DATED : June 10, 1980
INVENTOR(S) : YOSHIHITKO OMURA

It is certified that error appears in the above—identified patent and that said Letters Patent are hereby corrected as shown below:

"generating" in line 47, column 4, should read "controlling".

Signed and Sealed this

Fourth Day of November 1980

[SEAL]

Attest:

SIDNEY A. DIAMOND

Attesting Officer

Commissioner of Patents and Trademarks